UNITED STATES PATENT OFFICE.

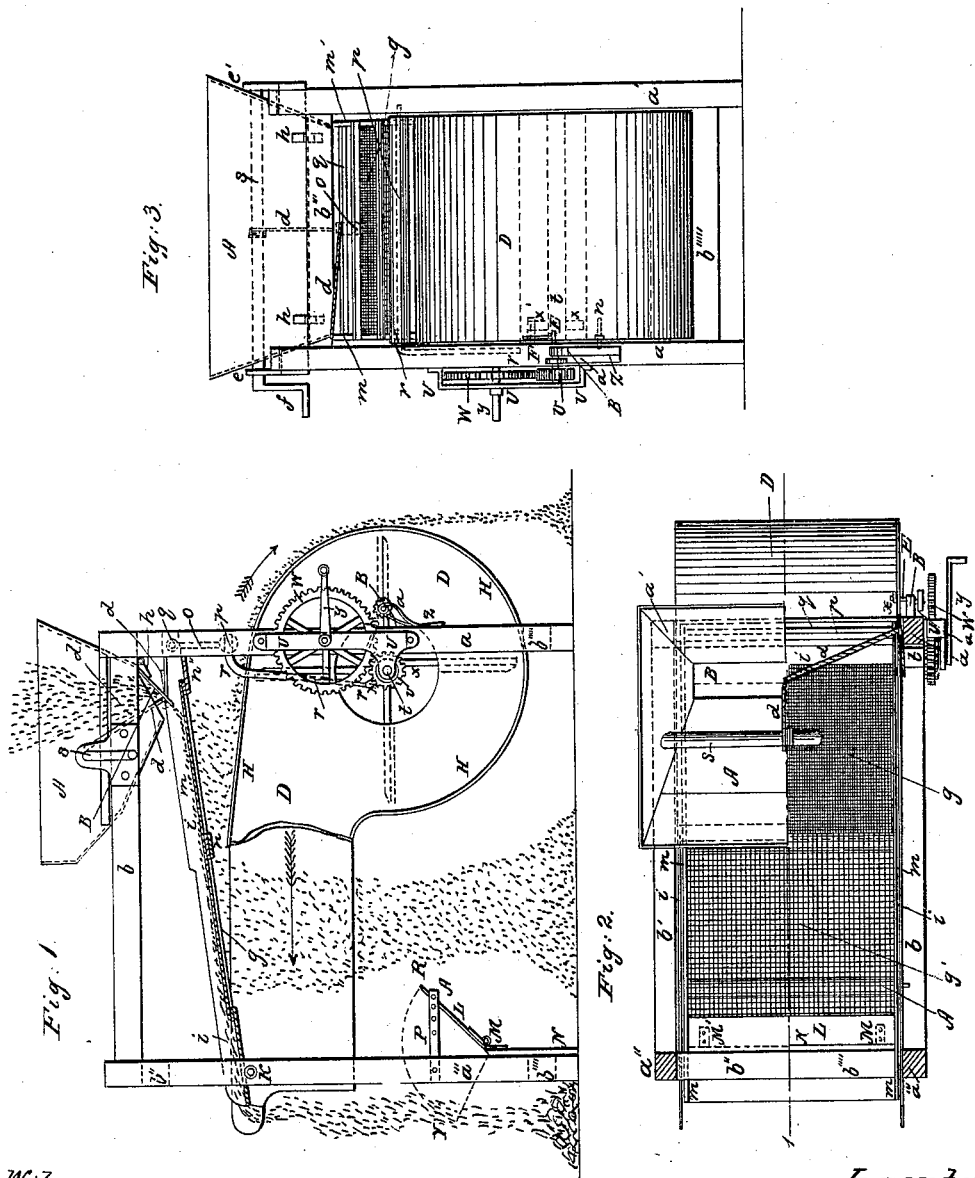

JOSEPH ROHMER, OF CHICAGO, ILLINOIS.

IMPROVEMENT IN GRAIN-WINNOWERS.

Specification forming part of Letters Patent No. 34,694, dated March 18, 1862.

*To all whom it may concern:*

Be it known that I, JOSEPH ROHMER, of Chicago, in the county of Cook, in the State of Illinois, have invented a new and Improved Mode of Constructing Grain-Separating Machines; and I do hereby declare that the following is a full, clear, and exact description thereof, reference being had to the annexed drawings, making a part of this specification, in which—

Figure 1 is a side elevation, Fig. 2 a plan, and Fig. 3 an end elevation.

The nature of my invention consists, first, of an arrangement to regulate the quantity of grain to fall upon the sieves for cleaning; second, of an arrangement effecting a continuous flow of the grain to be cleaned to the sieves; third, of an arrangement effecting not only the shaking motion given to the sieves, but also that given to the valve which regulates the quantity of grain to fall upon the sieves; fourth, of an arrangement allowing or preventing at pleasure the chaff to mix with the cleaned grain.

To enable others skilled in the art to make and use my invention, I will proceed to describe its construction and operation.

I construct my machine in the following manner: As it consists, first, of its frame; second, of a grain-feeding regulator; third, of the sieves with their shaking arrangement; fourth, of a fan, the object of which is to separate the chaff from the grain; fifth, of an arrangement allowing or preventing at pleasure the mixing of the chaff with the cleaned grain, I shall describe each of these five mentioned subjects separately.

(1.) *The frame.*—Four vertical posts $a\ a'\ a''\ a'''$ with their horizontal pieces $b\ b'\ b''\ b'''\ b''''\ b'''''$ form the frame of my smut-machine.

(2.) *The grain-feeding regulator.*—A represents a box for the reception of the grain to be cleaned. Box A projects above the frame of the machine and is placed and fastened between and to the upper horizontal frame-pieces $b\ b'$. The bottom of box A is formed by a trap-door or valve B. The hinges $h\ h$, which are fastened to the hind side of the box A, hold B to box A. The strap $d$ is fastened to B and to the shaft $s$. The latter extends transversely through box A and turns in the guides $e\ e'$, which are fastened to the outside of the upper horizontal frame-pieces $b\ b'$. Any motion given to the crank $f$ of shaft $s$ effects the shutting or opening of the trap bottom B, and therefore produces the regulation of the quantity of grain to fall through.

(3.) *The sieves with the arrangement to shake them.*—The sieves $g\ g'$ are placed in their inclined frame $i$. The frame $i$ consists of the longitudinal side pieces $m\ m'$ and of the bottom pieces $n\ n'\ n''$. Upon the latter the sieves $g\ g'$ rest. $g$ represents a fine sieve; $g'$, a coarser sieve. Sieve $g$ is placed just under the trap-bottom B, upon the transverse sieve-frame pieces $n'\ n''$. Sieve $g'$ is placed upon $n'\ n$. The sieve-frame $i$ rests with its lower end upon rod K. The upper end of it is held by means of the vertical arm $o$, which is fastened to the shaft $p$, ($p$ is placed between the rear vertical frame-posts $a\ a'$,) and in connection with the transverse rod $q$. The latter connects the longitudinal sieve-frame pieces $m\ m'$. Near the frame-post $a$ an arm $r$ is fastened to shaft $p$. Said arm is calculated to come alternately in contact with one of the two fingers $x\ x'$, which are fastened to the fan-wheel shaft $t$. With regard to the place where arm $r$ is attached to shaft $p$ and its point of junction on shaft $t$, requires $r$ to clear the frame-post $a$ and also the fan-house D. To the outside of the frame-post $a$ the iron frame $u$ is fastened. Said frame contains the journals of the gear-wheels $v$ and $w$. The wheel $v$—the smallest of the two—is fastened to the end of the fan-wheel shaft $t$, and receives motion from the wheel W as soon as crank $y$ gets moved. Crank $y$ is fastened to the wheel W. A spring Z is fastened with its lower end to the back side of the frame-post $a$. The upper end of spring Z is split. The inner part $x$ of it is circular, forming thereby a journal-box for shaft E, to which the ratchet-wheel F is fastened. The outer part B of spring Z is so bent as to form a stop or catch of the ratchet-wheel F. The strap $l'$ connects shaft E with the lower end of arm $r$, and by turning the ratchet-wheel F from the right to the left strap $l'$ will wind up upon shaft F, and by this spring Z is forced toward arm $r$, which causes the straining of spring Z, and turning the ratchet-wheel F the contrary direction the contrary takes place. The strap $l'$, with regard to its connection, has the effect of bringing arm $r$ back to its natural position after having been forced forward by the action of one of the fingers $x\ x'$. The arrangement consisting of the spring Z, with wheel F, in connection with the wheels V W, the fingers $x\ x'$ and the arm $r$, shaft $p$, and the vertical arm $o$, (the latter being in connection with the sieve-frame $i$ by means of rod $q$,) produces the shaking of the sieve-frame $i$ as soon as any motion is given to the wheel W. The regulation of the shaking motion is effected by the turning of the ratchet-wheel F with its shaft E. Turning F from the right to the left, this will cause an increase. A decrease is effected by turning F from the left to the right. The strap $d$, fastened to the trap-bottom B of box A, extends to the upper end of the sieve-frame piece $m$, to which it is also fastened, its object being to transmit the shaking motion given to the sieve-frame $i$ to the trap-door B, in consequence of which a continuous flow of grain from box A to the sieves $g\ g'$ is effected.

(4.) *The fan* D is placed and fastened between and to the vertical frame-posts $a\ a'\ a''\ a'''$. The straight part of it is without top and bottom for the purpose of allowing the chaff falling through the coarse sieve $g'$ to drop to the ground or floor. The circular part of it, or what is the same, the fan-house D, (in which the fan turns,) is covered by a sheet-iron covering H H. The upper part of the mantle H forms an inclined plane upon which, by means of the fine sieve $g$, the fine chaff falls. The inclined plane or the inclined part of mantle H effects the dropping of the fine chaff to the ground or floor, &c.

(5.) *The arrangement allowing or preventing at pleasure the mixing of the chaff with the cleaned grain.*—This arrangement is placed between the two forward or head frame-posts $a'''\ a''$. The adjustable partition L turns in the hinges M M'. The latter are placed and fastened to the fixed partition N, which is fastened to the back side of the same frame-posts, but below the movable partition L. The iron P, which is fastened to the inside of the front frame-post $a'''$, contains a number of holes for the reception of a pin K, the object of the latter being to hold partition L in a position wished. The position of L, as represented in Fig. 1, is such that no chaff will mix with the cleaned grain, but moving L in the line Y the mixing of the chaff with the cleaned grain is produced. The object of the fan D is to separate the chaff which is passing with the grain through the coarse sieve $g'$ from the grain.

The operation of my smut-machine is as follows: The grain to be cleaned is filled into the grain-box A. (Suppose it is wheat, then I will say it becomes necessary to open the bottom B about one-fourth of an inch by setting crank $f$ of shaft $s$ accordingly up.) Then power is applied to crank $y$, (the latter being in direct connection with the wheel W,) by which the fan is put in operation, as well as the sieve-frame $i$ and also the bottom B. The grain, with the chaff, falls through the opening, which is effected by means of the position given to the bottom B. The inclination or the inclined position of sieve-frame $i$, in connection with the shaking motion given to frame $i$, causes the fine chaff to fall through sieve $g$ upon the inclined portion of the fan-house mantle H, and from the latter to the ground or floor, &c. It also causes the grain with the coarse chaff to travel to and upon the coarse sieve $g'$. Here the grain can drop to the ground, but the chaff passing with the grain through the sieve $g'$ becomes separated by means of the air-current produced by the fan. The straw passes over the sieve $g'$ and falls to the ground or floor. If it is wished that the grain should be mixed (more or less) with chaff, it will be necessary to change the position of the movable partition L accordingly. The farther off from the post $a'''$ toward Y the partition L is placed the more chaff will mix with the cleaned grain. The closer to the post, the contrary is effected.

What I claim as my invention, and desire to secure by Letters Patent, is—

1. The arrangement of the adjustable partition L, sieves $g\ g'$, and fan D, constructed and operated as and for the purpose set forth.

2. The arrangement of the adjustable trap-bottom B, connected with the sieve-frame $i$, the arm $r$, strap $l'$, and adjustable spring Z, as and for the purpose above set forth.

In testimony whereof I have hereunto signed my name before two subscribing witnesses.

JOSEPH ROHMER.

Witnesses:
   F. PASDELOUP,
   C. D. WOLF.